United States Patent
Islas et al.

(10) Patent No.: US 11,919,789 B2
(45) Date of Patent: Mar. 5, 2024

(54) VACUUM REGULATED OZONE GENERATOR

(71) Applicant: ECLEAN TECHNOLOGIES, LLC, La Canada, CA (US)

(72) Inventors: Alejandro Islas, San Gabriel, CA (US); William Lance Burrows, Big Bear Lake, CA (US)

(73) Assignee: ECLEAN TECHNOLOGIES, LLC, La Canada, CA (US)

( * ) Notice: Subject to any disclaimer, the term of this patent is extended or adjusted under 35 U.S.C. 154(b) by 589 days.

(21) Appl. No.: 17/276,116

(22) PCT Filed: Sep. 13, 2019

(86) PCT No.: PCT/US2019/051088
§ 371 (c)(1),
(2) Date: Mar. 12, 2021

(87) PCT Pub. No.: WO2020/056312
PCT Pub. Date: Mar. 19, 2020

(65) Prior Publication Data
US 2022/0033289 A1 Feb. 3, 2022

Related U.S. Application Data

(60) Provisional application No. 62/731,643, filed on Sep. 14, 2018.

(51) Int. Cl.
*C02F 1/78* (2023.01)

(52) U.S. Cl.
CPC .......... *C02F 1/78* (2013.01); *C02F 2201/782* (2013.01); *C02F 2201/784* (2013.01); *C02F 2209/03* (2013.01)

(58) Field of Classification Search
None
See application file for complete search history.

(56) References Cited

U.S. PATENT DOCUMENTS

| | | | | |
|---|---|---|---|---|
| 2,778,800 | A * | 1/1957 | Sheahan | C02F 1/78 137/637.1 |
| 3,741,188 | A * | 6/1973 | Rickey | F02M 3/08 123/DIG. 11 |
| 5,151,250 | A * | 9/1992 | Conrad | A61L 2/202 137/895 |

(Continued)

*Primary Examiner* — Chester T Barry
(74) *Attorney, Agent, or Firm* — Loza & Loza, LLP; Derek Yeung (57) ABSTRACT

A water treatment system can generate ozonated water using a vacuum operated injector with reduced vacuum switch lockup. The water treatment system includes an ozone generator, an ozone injector, a vacuum switch, and a pressure regulator. The ozone generator is configured to generate ozone. The ozone injector is coupled to the ozone generator via a hermetically sealed tubing, and the ozone injector is configured to inject the ozone into a water flow passing through the ozone injector. The vacuum switch is configured to operate the ozone generator based on a gaseous pressure inside the hermetically sealed tubing generated by the ozone injector. The pressure regulator is configured to regulate the gaseous pressure inside the hermetically sealed tubing to prevent the vacuum switch from trapped in a triggered state after the water flow stops.

16 Claims, 7 Drawing Sheets

(56) References Cited

U.S. PATENT DOCUMENTS

| 5,236,673 A | * | 8/1993 | Coakley | .................. | C02F 1/78 |
| | | | | | 422/186.18 |
| 2014/0175016 A1 | * | 6/2014 | Strain | .................. | C02F 1/78 |
| | | | | | 210/90 |

* cited by examiner

VACUUM REGULATED OZONE GENERATOR

PRIORITY CLAIM

This application is the U.S. National Stage of International Patent Application No. PCT/US2019/051088 filed Sep. 13, 2019, which claims priority to and the benefit of U.S. provisional patent application No. 62/731,643 filed in the United States Patent and Trademark Office on Sep. 14, 2018, the entire contents of which are incorporated herein by reference as if fully set forth below in their entirety and for all applicable purposes.

BACKGROUND

Ozone contains three atoms of oxygen ($O_3$) that is different than the two atoms oxygen ($O_2$) in breathable air (hereafter "air"). Ozone may also be known as "activated oxygen" or $O_3$. The oxidizing properties of ozone can reduce or eliminate taste and odor problems in air or water. Furthermore, ozone is a powerful sterilant that can be used as an effective disinfectant to treat air, water, or other fluids. In some applications, ozone effectively kills bacteria, viruses, microorganisms, spores, and many other pathogens, while it removes dissolved organic materials by oxidative processes. Ozone has been used to treat and disinfect water supply.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Aspects of the present disclosure provide a water treatment system and method that can generate ozonated water using a vacuum operated injector with reduced vacuum switch lockup. In some aspects of the disclosure, the water treatment system has a tubing arrangement (hereafter "tubing") that optimizes ozone distribution efficiency.

One aspect of the present disclosure provides a water treatment system using ozone. The water treatment system includes an ozone generator, an ozone injector, a vacuum switch, and a pressure regulator. The ozone generator is configured to generate ozone. The ozone injector is coupled to the ozone generator via a hermetically sealed tubing, and the ozone injector is configured to inject the ozone into a water flow passing through the ozone injector. The vacuum switch is configured to operate the ozone generator based on a gaseous pressure inside the hermetically sealed tubing generated by the ozone injector. The pressure regulator is configured to regulate the gaseous pressure inside the hermetically sealed tubing to prevent the vacuum switch from trapped in a triggered state after the water flow stops.

Another aspect of the present disclosure provides a method of treating water using ozone. The method generates a water flow through an ozone injector coupled to an ozone generator via a hermetically sealed tubing. The ozone injector is configured to inject ozone into the water flow. The method further uses a vacuum switch to control the ozone generator to supply the ozone. The vacuum switch is controlled by a gaseous pressure inside the hermetically sealed tubing. The method further uses a pressure regulator to regulate the gaseous pressure inside the hermetically sealed tubing to maintain the vacuum switch in a triggered state during the water flow. The method further uses the pressure regulator to increase the gaseous pressure inside the hermetically sealed tubing to release the vacuum switch from the triggered state when the water flow stops.

Another aspect of the present disclosure provides a water treatment system using ozone. The system includes means for injecting ozone into a water flow. The system further includes means for generating the ozone. The system further includes means for controlling the ozone generation based on a gaseous pressure inside a hermetically sealed tubing configured to supply the ozone. The system further includes means for regulating the gaseous pressure inside the hermetically sealed tubing to activate the ozone generation during the water flow and deactivate the ozone generation when the water flow stops.

DETAILED DESCRIPTION

Referring now to the drawings, embodiments of systems and methods of a water treatment system using ozone as a sterilant or disinfectant are disclosed in the present disclosure. Aspects of the present disclosure provide a water treatment system that can generate ozonated water using a vacuum operated injector with reduced vacuum switch lockup. In some aspects of the disclosure, the water treatment system has a tubing arrangement (hereafter "tubing") that optimizes ozone distribution efficiency.

Figure 1:
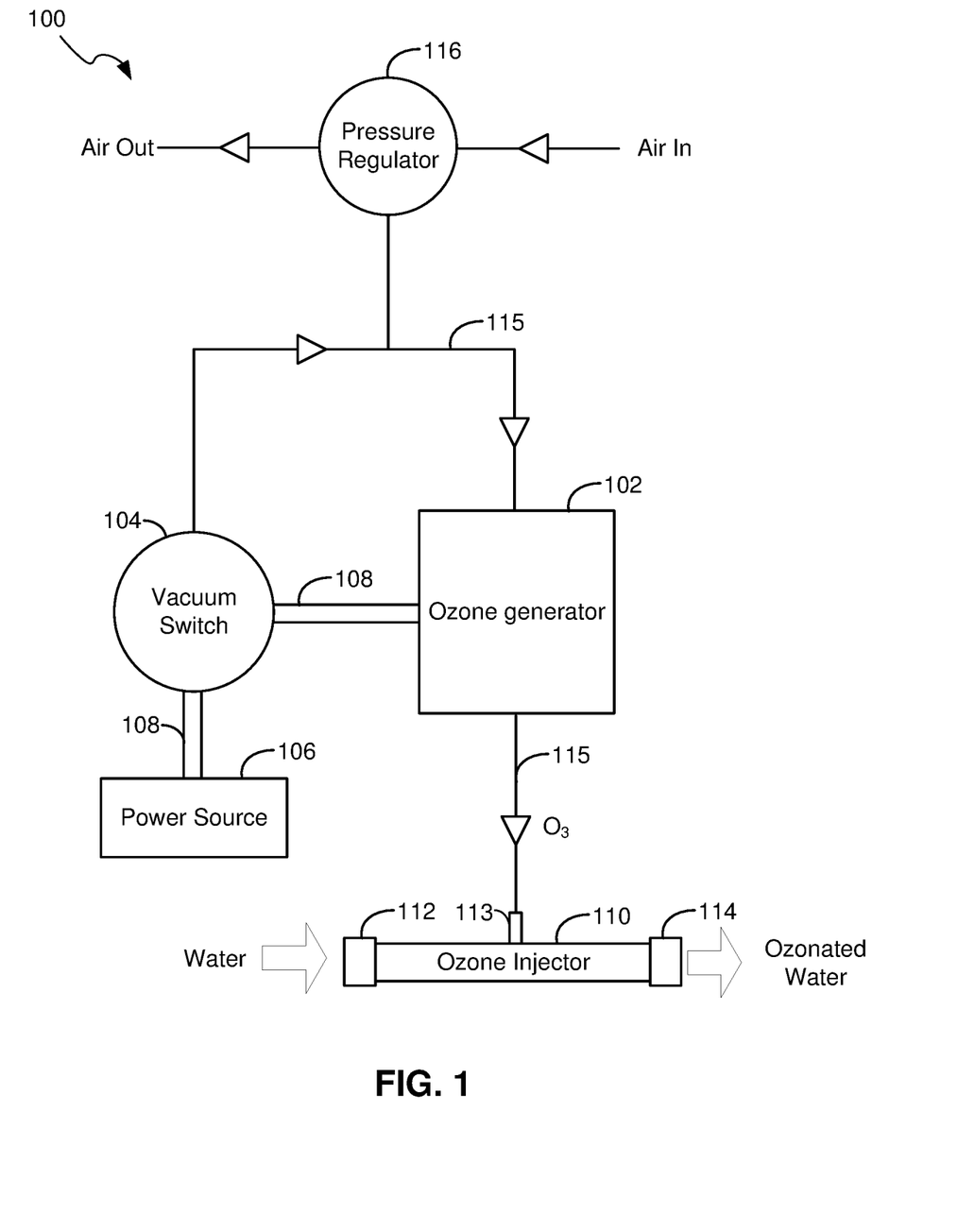
FIGS. 1 and 2 are conceptual diagrams illustrating a water treatment system using ozone according to an embodiment.
Figure 2:
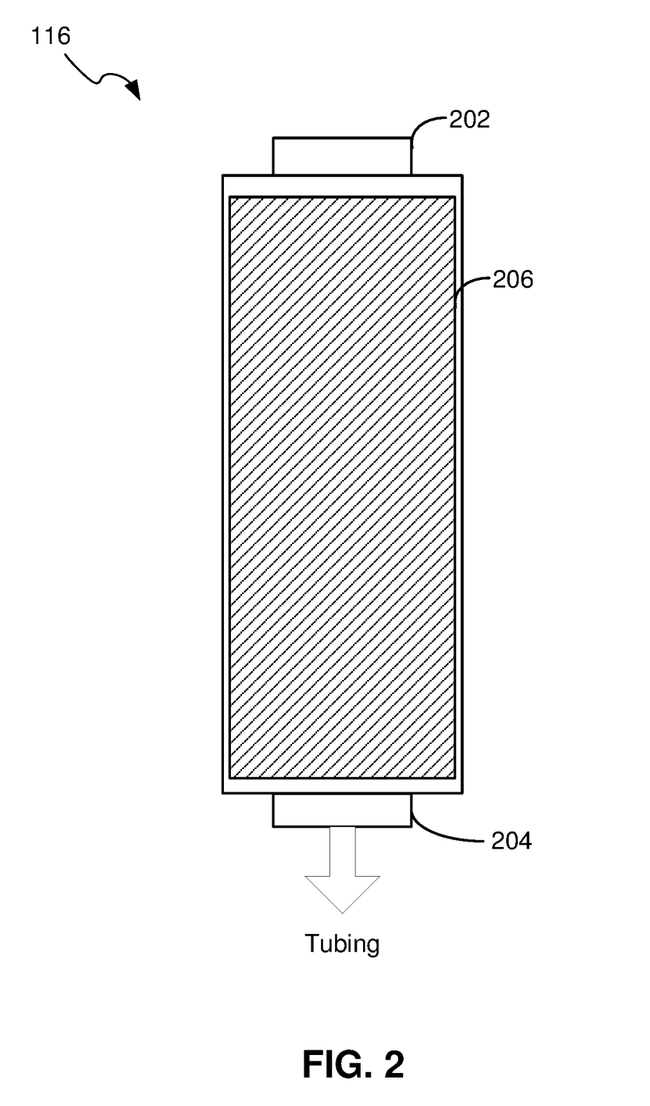

FIGS. 1 and 2 are conceptual diagrams illustrating a water treatment system 100 using ozone according to one embodiment. Referring to FIG. 1, the system 100 includes an ozone generator 102 that is controlled (i.e., turned on and off) by a vacuum switch 104. The ozone generator 102 may be any devices that generate ozone (e.g., 03). In one example, the ozone generator may be a corona discharge type that utilizes a ballast to energize a dielectric chamber. Air is drawn through the chamber in the ozone generating process. The vacuum switch 104 controls (e.g., switch on/off) supply of power from a power source 106 to the ozone generator 102 via electrical wirings 108. In one example, the power source 106 may be an AC power source (e.g., AC power grid). In another example, the power source 106 may be a DC power supply (e.g., battery).

The system 100 further includes an ozone injector 110 for injecting ozone into a flow of water. Water enters the ozone injector 110 at an inlet 112, and ozonated water exists at an outlet 114. In one example, the ozone injector 110 may be a Venturi injector consisting of the inlet 112, a suction inlet 113, the outlet 114, and a convergent-divergent constriction (not shown in FIG. 1). Low pressure is generated as water flows through the converging passage that gradually widens. The constriction causes a high velocity by which a low pressure at the suction inlet 113 is caused. Thus, the ozone at the suction inlet 113 is drawn into the injector 110 and mixes with the passing water. The flow of water creates a low gaseous pressure or vacuum at the suction inlet 113 of the injector 110. For example, the low gaseous pressure is lower than the gaseous pressure (e.g., atmospheric pressure) outside of the system. The low pressure propagates through the system via the airtight or hermetically sealed tubing 115 (e.g., an arrangement of vacuum tubes or conduits) connecting the ozone injector 110, ozone generator 102, vacuum switch 104, and a pressure regulator 116. When a low pressure or vacuum is generated at the ozone injector 110, outside air enters the tubing 115 of the system via the pressure regulator 116. The pressure regulator 116 is configured to control, maintain, or modify the gaseous pressure inside the tubing 115 at a suitable level to trigger the vacuum switch 104 while water flows through the ozone injector 110. When the vacuum switch 104 is triggered, it supplies electrical power to operate (i.e., turn on) the ozone generator 102 to generate ozone that is supplied to the ozone injector 110. The ozone generator 102 may be configured to produce ozone as long as power is received from the power source 106 via the vacuum switch 104. The ozone injector 110 receives the ozone produced by the ozone generator 102 and injects the ozone into the water flow to treat and disinfect the water, making it safer for human consumption.

When the ozone injector 110 generates a low gaseous pressure or near vacuum inside the tubing 115, the pressure regulator 116 regulates or maintains the pressure in the tubing by controlling the rate or amount of air entering or exiting (illustrated as Air In and Air Out in FIG. 1) the system via the pressure regulator 116. The pressure regulator 116 is configured to restrict air flow in or out of the system 100 to a suitable degree to maintain the gaseous pressure in the tubing 115 below atmospheric or outside air pressure when the ozone injector 110 operates. For example, the pressure regulator 116 regulates the gaseous pressure inside the tubing 115 to be sufficiently low (e.g., a predetermined gaseous pressure) to trigger the vacuum switch 104. When the water flow stops, the ozone injector 110 stops operating, the pressure regulator 116 allows air to enter or exit the tubing 115 such that the gaseous pressure inside the tubing eventually is substantially the same as the outside pressure or atmospheric pressure. Therefore, the vacuum switch 104 is reset or released (i.e., not triggered), thus turning off or disabling the ozone generator 102. The vacuum switch may be any means or device that includes an electrical switch (e.g., a single-pole, single-throw (SPST) switch) operated by gaseous pressure or vacuum.

The pressure regulator 116 reduces the chance that the vacuum switch 104 remains trapped in the triggered state due to a vacuum or low gaseous pressure lock-up condition in the tubing 115. In that case, the vacuum switch 104 is locked in the triggered state and unnecessarily keeping the ozone generator 102 turned on. Without the pressure regulator 116, no air can enter or exit the system's tubing 115 except via the ozone injector 110, and the gaseous pressure inside the tubing 115 may be kept in a low pressure even after the water flow stops. In some scenarios, when the ozone injector 110 is not operated (i.e., no water flow), any low gaseous pressure or vacuum previously created in the tubing 115 may remain or substantially maintained. This remaining or residual low pressure may keep the vacuum switch 104 in the triggered state, hence unnecessarily wasting power to operate the ozone generator 102.

FIG. 2 is a diagram conceptually illustrating an embodiment of the pressure regulator 116. The shapes and sizes illustrated in FIG. 2 are only illustrative, and the present invention is not limited thereto. The pressure regulator 116 may have a first opening 202 and a second opening 204 for air ingress and egress. For example, the second opening 204 may be coupled to the hermetically sealed tubing 115 shown in FIG. 1. The first opening 202 allows air to enter or exit the tubing 115 via an airflow restriction member 206. The direction of airflow depends on the relative gaseous pressure difference between the inside and outside of the tubing 115. When the gaseous pressure inside the tubing 115 is lower than the outside pressure, outside air enters the tubing at a rate restricted, choked, or limited by the airflow restriction member 206. When the gaseous pressure outside the tubing 115 is lower than the pressure inside the tubing 115, air inside the tubing exits the system at a rate restricted or regulated by the airflow restriction member 206. In one embodiment, the airflow restriction member 206 may be a porous member (e.g., foam) or any suitable material that restricts airflow. In one embodiment, the airflow restriction member 206 may have a number of small air passages extending between the first opening 202 and second opening 204.

Figure 3:
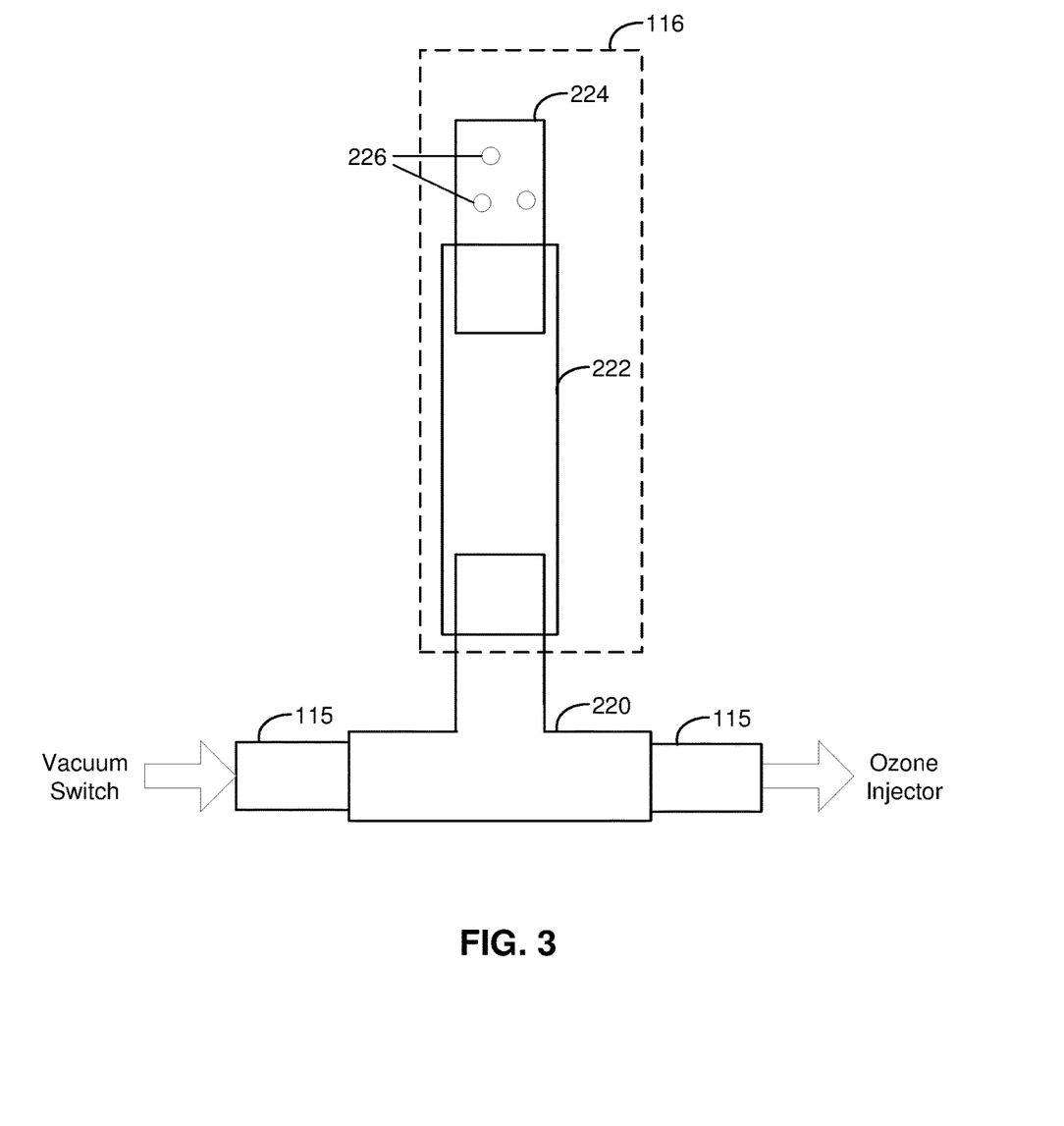
FIG. 3 is a diagram conceptually illustrating an exemplary ozone generator according to an embodiment.

FIG. 3 is a diagram conceptually illustrating another embodiment of the pressure regulator 116. The pressure regulator 116 may be connected in-line between the vacuum switch 104 and the ozone injector 110, for example, using a tee coupler 220 (e.g., PVC (polyvinyl chloride) barbed tee) or the like. In other embodiments, the pressure regulator 116 may be connected to other locations of the tubing 115. The pressure regulator 116 may consist of a tube 222 (e.g., PVC tube). One end of the tube 222 is hermetically connected to the tee coupler 220. A rubber porous tube 224 is partially inserted into another end of the tube 222. The exposed portion of the rubber porous tube 224 has one or more holes or air passages 226 (3 exemplary holes shown in FIG. 3). For example, the holes may be equally spaced on each side of the porous tube 224. The holes 226 allow air ingress and egress at a predetermined rate such that the gaseous pressure inside the tubing 115 may be regulated via the pressure regulator 116. During operation, water flows through the ozone injector 110, thus generating a low pressure at the inlet 113 that causes the gaseous pressure to drop inside the tubing 115. The pressure regulator 116 allows outside air to enter the tubing 115 so that the gaseous pressure in the tubing 115 is maintained at a predetermined pressure to trigger the vacuum switch 104. When water stops flowing through the ozone injector 110, the pressure regulator 116 allows outside air to enter the tubing 115 to equalize the vacuum or low gaseous pressure condition inside the tubing 115 to release the vacuum switch 104.

Figure 4:
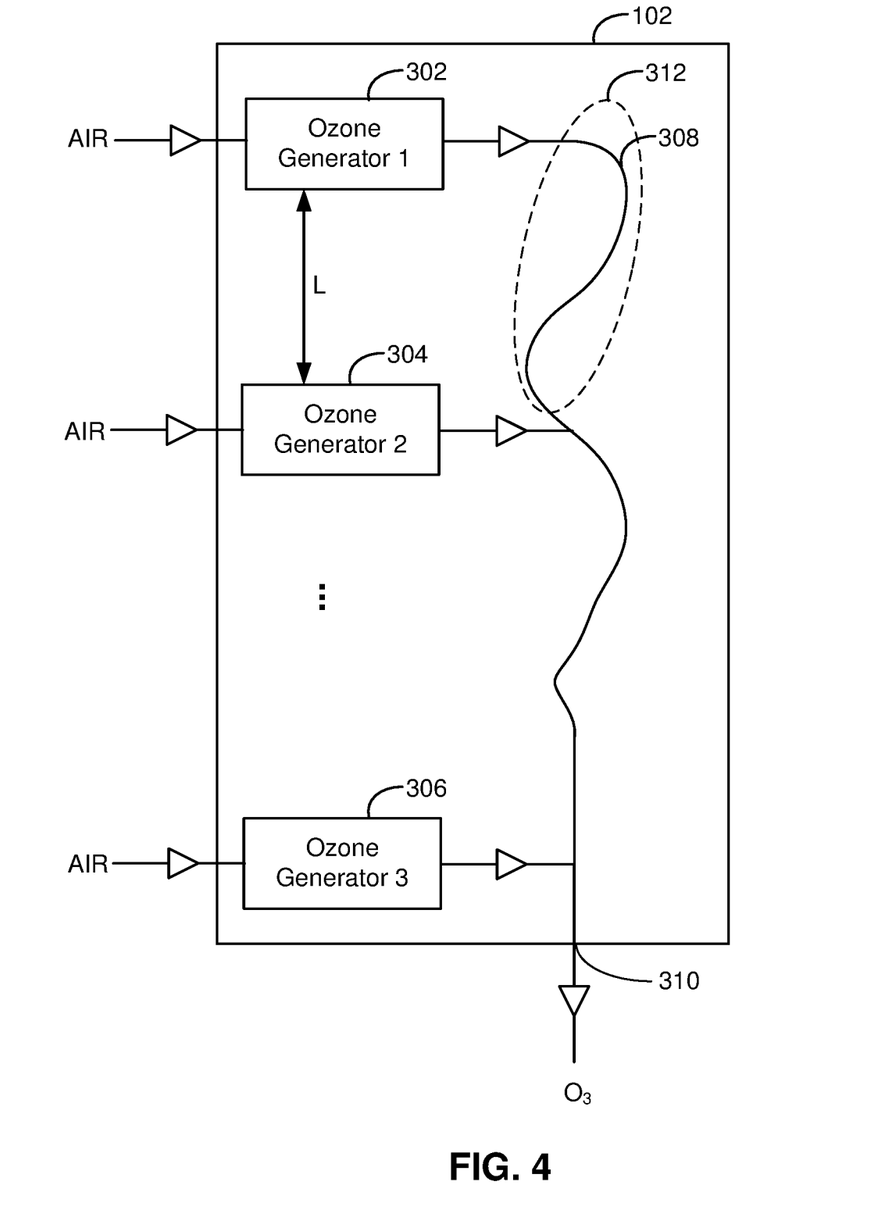
FIG. 4 is a flow chart illustrating an exemplary water cleaning method using ozone according to an embodiment.
Figure 5:
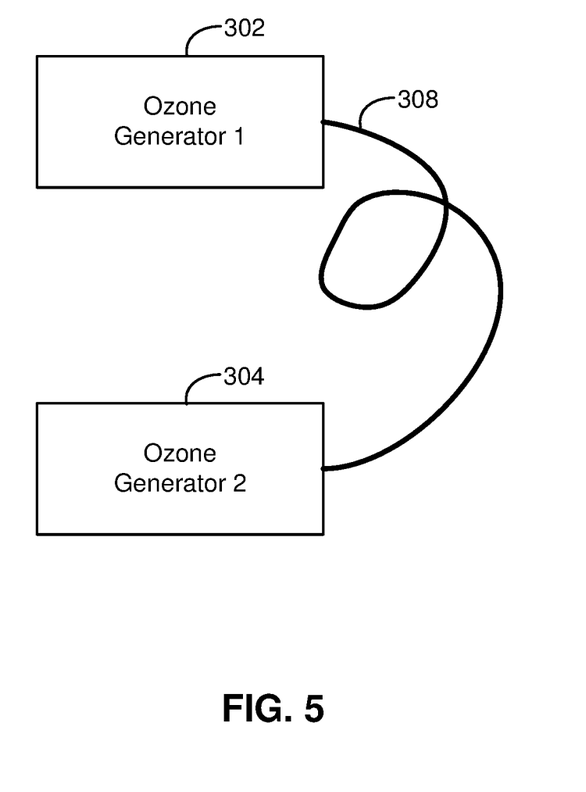
FIG. 5 is a diagram conceptually illustrating an exemplary interconnected tubing according to an embodiment.

FIG. 4 is a diagram conceptually illustrating an embodiment of the ozone generator 102. In one example, the ozone generator 102 may include two or more separate ozone generators. Three exemplary ozone generators 302, 304, and 306 are shown in FIG. 3. These ozone generators may be any suitable ozone generators configured to generate ozone ($O_3$). Air containing oxygen enters the ozone generators 302, 304, and 306 at their respective inlets, and the ozone generators provide ozone at their respective outlets. Ozone from each ozone generator (e.g., ozone generators 302, 304, and 306) is conveyed via an interconnected tubing 308 to an outlet 310 of the ozone generator. The interconnected tubing 308 may be a part of the tubing 115 that includes multiple sections hermetically coupled to each other via various couplers. A section (e.g., section 312) of the interconnected tubing 308 between two adjacent ozone generators (e.g., ozone generators 302 and 304) may be longer in length than the physical distance L between the adjacent ozone generators. In some embodiments, the interconnected tubing 308 may be arranged to avoid any sharp or acute bends (e.g., a bend equate to or less than 90 degrees). For example, a section (e.g., section 312) of the interconnected tubing 308 between two adjacent ozone generators 302 and 304 is arranged in a tortuous shape (e.g., curve, loop, spiral, winding, or the like) without any acute bend. By extending the length of the interconnected tubing 308 without any acute bend between the ozone generators, ozone distribution may be increased or optimized. For example, referring to FIG. 5, the interconnected tubing 308 may be arranged in one or more loops between adjacent ozone generators to promote an even ozone draw/distribution for better equipment performance in conjunction with the vacuum regulator/system design. The loops may decrease oxidation collection in the ozone generator's dielectric chamber, system tubing, and fittings. That is, the loop may reduce damage and wear of the system and promote a longer working lifespan for the various components that come in contact with the ozone gas. Furthermore, looping the tubing allows for optimal use of the ozone generated and increases the oxidation-reduction potential (ORP) levels in the ozonated water that is created by the system.

Figure 6:
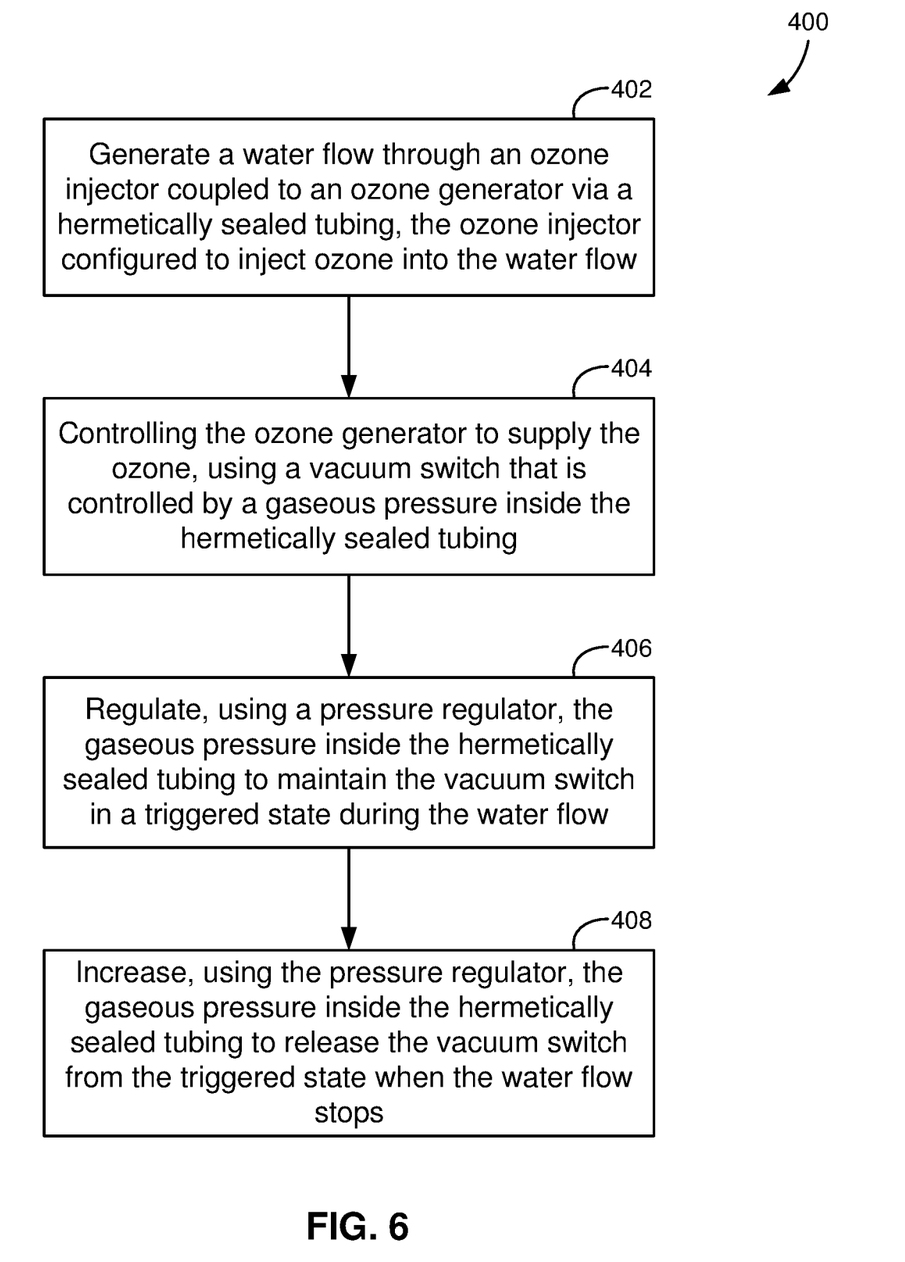
FIG. 6 is a flow chart illustrating an exemplary water cleaning method using ozone according to some aspects of the present disclosure.

FIG. 6 is a flow chart illustrating an exemplary water cleaning method 400 using ozone according to some aspects of the present disclosure. As described below, some or all illustrated features may be omitted in a particular implementation within the scope of the present disclosure, and some illustrated features may not be required for the implementation of all embodiments. In some examples, the method 400 may be carried out using the water treatment system 100 described in relation to FIGS. 1-5.

At block 402, a water flow passes through an ozone injector 110 that is coupled to an ozone generator 102 via a hermetically sealed tubing 115. The ozone injector is configured to inject ozone into the water flow. In one example, the water flow may be generated by using a water pump or the like. In another example, the water flow may be from a tap water source or any pressurized water source. When the water flow passes through the ozone injector 110, a low gaseous pressure or vacuum is generated in the tubing 115 via the suction inlet 113.

At block 404, the vacuum switch 104 controls the ozone generator 102 to supply the ozone. The vacuum switch 104 is triggered by the low gaseous pressure inside the hermetically sealed tubing. That is, when the gaseous pressure inside the hermetically sealed tubing 115 is below a predetermined threshold, the vacuum switch is triggered and turns on the ozone generator 102 to generate ozone as described above.

At block 406, a pressure regulator 116 regulates the gaseous pressure inside the hermetically sealed tubing 115 to maintain the vacuum switch in a triggered state during the water flow. For example, the pressure regulator 116 is configured to control or restrict airflow into the tubing to generate or maintain a low gaseous pressure inside the tubing when water flows through the ozone injector 110. When the water flow generates a low gaseous pressure at or near the suction inlet 113 of the ozone injector 110, ozone-filled air is sucked into the ozone injector 110, thus lowing the gaseous pressure inside the tubing 115. Outside air can enter the tubing 115 via the pressure regulator 116 at a predetermined rate to maintain the gaseous pressure inside the tubing 115 sufficiently low to trigger the vacuum switch 104.

At block 408, when there is no water flow, the pressure regulator 116 allows air into the tubing so that the low gaseous pressure inside the tubing 115 may be increased to release (e.g., turn off) the vacuum switch from the triggered state. That is, when the gaseous pressure inside the tubing rises above a predetermined threshold, the vacuum switch turns off (i.e., not triggered), thus cutting the power supplied to the ozone generator. Without the pressure regulator 116, the gaseous pressure inside the tubing 115 may be locked in a low pressure state that keeps the vacuum switch 104 in the triggered state, thus unnecessarily supplying power to the ozone generator 102.

Figure 7:
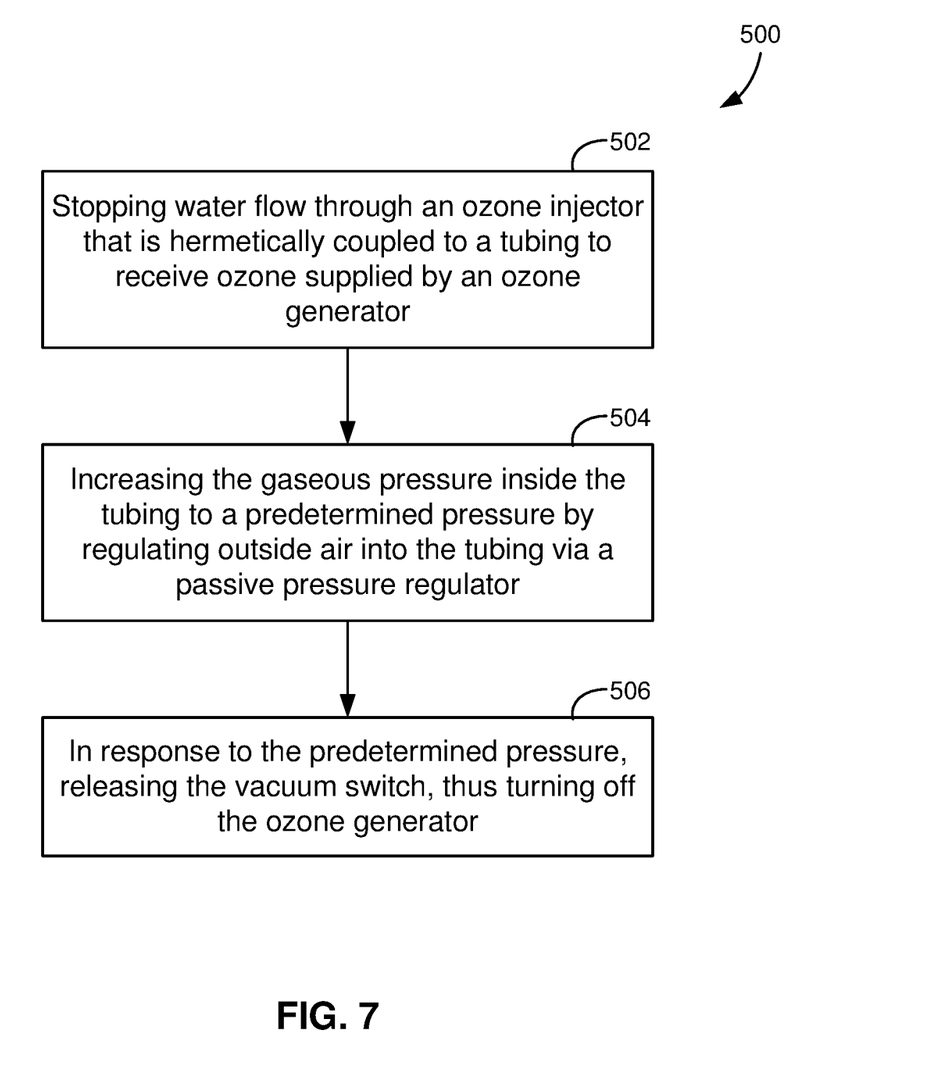
FIG. 7 is a flow chart illustrating an exemplary process for controlling a pneumatically operated ozone generator according to some aspects of the present disclosure.

FIG. 7 is a flow chart illustrating an exemplary process 500 for controlling a pneumatically operated ozone generator according to some aspects of the present disclosure. As described below, some or all illustrated features may be omitted in a particular implementation within the scope of the present disclosure, and some illustrated features may not be required for the implementation of all embodiments. In some examples, the process may be carried out using the water treatment system 100 described in relation to FIGS. 1-5.

It is assumed that the water treatment system 100 has been in operation and the vacuum switch 104 is triggered to turn on the ozone generator 102 as described above. At block 502, water stops flowing through the ozone injector 110 that is hermetically coupled to the tubing 115 to receive the ozone supplied by the ozone generator 102. At block 504, the air pressure inside the tubing 115 is increased to a predetermined pressure by regulating outside air into the tubing 115 via a passive pressure regulator (pressure regulator 116). The passive pressure regulator can operate without power and/or active control. At block 506, in response to the predetermined pressure, the vacuum switch 104 is released, thus turning off the ozone generator 102. The above-described process can be used in block 408 described above in relation to FIG. 6.

While the above description contains many specific embodiments of the invention, these should not be construed as limitations on the scope of the invention, but rather as examples of specific embodiments thereof. Accordingly, the scope of the invention should be determined not by the embodiments illustrated, but by the appended claims and their equivalents.

What is claimed is:
1. A water treatment system using ozone, comprising:
an ozone generator for supplying ozone;
an ozone injector coupled to the ozone generator via a hermetically sealed tubing, the ozone injector configured to inject the ozone into a water flow passing through the ozone injector;
a vacuum switch configured to operate the ozone generator based on a gaseous pressure inside the hermetically sealed tubing generated by the ozone injector; and
a pressure regulator configured to regulate the gaseous pressure inside the hermetically sealed tubing to prevent the vacuum switch from trapped in a triggered state after the water flow stops.
2. The water treatment system of claim 1, wherein the ozone injector comprises a Venturi injector.
3. The water treatment system of claim 1, wherein the ozone generator comprises:

a first ozone generator comprising an outlet for supplying the ozone;

a second ozone generator comprising an outlet for supplying the ozone; and a tortuous tubing coupled between the outlet of the first ozone generator and the outlet of the second ozone generator, for conveying the ozone to the ozone injector, wherein the tortuous tubing is longer in length than a distance between the outlet of the first ozone generator and the outlet of the second ozone generator.

4. The water treatment system of claim 3, wherein the tortuous tubing comprises no acute bend.

5. The water treatment system of claim 3, wherein the pressure regulator comprises a porous member configured to restrict an airflow of outside air into the hermetically sealed tubing.

6. The water treatment system of claim 5, wherein the pressure regulator further comprises:

a tube having a first end and a second end, the first end coupled to the hermetically sealed tubing and the second end coupled to the porous member.

7. The water treatment system of claim 1, wherein the vacuum switch is configured to turn on the ozone generator in the triggered state when the gaseous pressure inside the hermetically sealed tubing is lower than a predetermined threshold.

8. The water treatment system of claim 7, wherein the pressure regulator is configured to release the gaseous pressure inside the hermetically sealed tubing when no water flows through the ozone injector.

9. A method of treating water using ozone, comprising:

generating a water flow through an ozone injector coupled to an ozone generator via a hermetically sealed tubing, the ozone injector configured to inject ozone into the water flow;

controlling the ozone generator to supply the ozone, using a vacuum switch that is controlled by a gaseous pressure inside the hermetically sealed tubing;

regulating, using a pressure regulator, the gaseous pressure inside the hermetically sealed tubing to maintain the vacuum switch in a triggered state during the water flow; and increasing, using the pressure regulator, the gaseous pressure inside the hermetically sealed tubing to release the vacuum switch from the triggered state when the water flow stops.

10. The method of claim 9, wherein the regulating the gaseous pressure comprises:

restricting airflow via the pressure regulator such that the gaseous pressure inside the hermetically sealed tubing is lower than gaseous pressure outside the hermetically sealed tubing.

11. The method of claim 9, wherein the controlling the ozone generator comprises:

turning on the ozone generator when the gaseous pressure inside the hermetically sealed tubing is lower than a predetermined threshold.

12. The method of claim 9, wherein the increasing the gaseous pressure comprises:

equalizing the gaseous pressure inside the hermetically sealed tubing with pressure outside of the hermetically sealed tubing to release the vacuum switch from the triggered state.

13. A water treatment system using ozone, comprising:

means for injecting ozone into a water flow;

means for generating the ozone;

means for controlling the ozone generation based on a gaseous pressure inside a hermetically sealed tubing configured to supply the ozone; and means for regulating the gaseous pressure inside the hermetically sealed tubing to activate the ozone generation during the water flow and deactivate the ozone generation when the water flow stops.

14. The water treatment system of claim 13, wherein means for regulating the gaseous pressure is configured to:

restrict outside air entering into the hermetically sealed tubing such that the gaseous pressure inside the hermetically sealed tubing is lower than gaseous pressure outside the hermetically sealed tubing.

15. The water treatment system of claim 13, wherein the means for regulating the gaseous pressure is configured to:

maintain the gaseous pressure inside the hermetically sealed tubing to be lower than a predetermined threshold to activate the ozone generation.

16. The water treatment system of claim 13, wherein the means for regulating the gaseous pressure is configured to:

equalize the gaseous pressure inside the hermetically sealed tubing with pressure outside of the hermetically sealed tubing to deactivate the ozone generation.

* * * * *